US007120536B2

(12) United States Patent
Peron et al.

(10) Patent No.: US 7,120,536 B2
(45) Date of Patent: Oct. 10, 2006

(54) METHOD OF DIAGNOSING THE OPERATING STATE OF A MOTOR VEHICLE DIESEL ENGINE

(75) Inventors: Ludovic Peron, Villorceau (FR); Guillaume Meissonnier, Landes le Gaulois (FR); Claire Vermonet, Paris (FR); Cédric Lorret, Paris (FR)

(73) Assignees: Peugeot Citroen Automobiles SA, Velizy-Villacoublay (FR); Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/045,042

(22) Filed: Jan. 31, 2005

(65) Prior Publication Data

US 2005/0171680 A1 Aug. 4, 2005

(30) Foreign Application Priority Data

Feb. 2, 2004 (FR) .................................. 04 00974

(51) Int. Cl.
*G06F 19/00* (2006.01)

(52) U.S. Cl. ...................................................... 701/114

(58) Field of Classification Search ................ 701/114, 701/110, 111, 102, 101; 73/117.3, 115; 123/406.21, 123/406.23, 406.42

See application file for complete search history.

(56) References Cited

U.S. PATENT DOCUMENTS 4,598,680 A * 7/1986 Lanfer ................... 123/406.23
4,660,535 A * 4/1987 Asano ................... 123/406.21
4,744,243 A 5/1988 Tanaka ...................... 73/117.3
5,168,854 A 12/1992 Hashimoto et al. .... 123/406.17
5,623,412 A * 4/1997 Masson et al. ............ 701/102
6,684,151 B1 1/2004 Ring .......................... 701/110

OTHER PUBLICATIONS

Patent Abstracts of Japan, Publication No. 58211545, dated Dec. 9, 1983. Cited in the French Search Report.

Paul S. Min; Institute of Electrical and Electronics Engineers, Proceedings of the American Control Conference, vol. 2, Conf. 8, Jun. 21-23, 1989. Cited in the French Search Report.

* cited by examiner

*Primary Examiner*—Hieu T. Vo
(74) *Attorney, Agent, or Firm*—Nicolas E. Seckel

(57) ABSTRACT

In the method of diagnosing the operating state of a motor vehicle diesel engine of the invention, the engine includes a pressure acquisition system associated with each cylinder of the engine to acquire the pressure in that cylinder, an engine shaft angle acquisition system adapted to deliver the crankshaft angle of each cylinder, and onboard correction system adapted to correct a predetermined set of malfunctions and drifts of the cylinders and the acquisition systems. The method includes an analysis step of analyzing the operation of each cylinder and the cylinder pressure and engine shaft angle acquisition systems by identifying an operating state of the set comprising that cylinder and those systems based on predetermined characteristics of the signal delivered by the cylinder pressure acquisition system, and a correction step of correcting identified malfunctions and drifts.

19 Claims, 6 Drawing Sheets

METHOD OF DIAGNOSING THE OPERATING STATE OF A MOTOR VEHICLE DIESEL ENGINE

The present invention relates to a method of diagnosing the operating state of a motor vehicle diesel engine.

BACKGROUND OF THE INVENTION

Systems for diagnosing the operating state of a motor vehicle diesel engine are known in the art that use information supplied by systems for acquiring signals associated with the engine, generally comprising systems for acquiring the pressure in the engine cylinders and the engine shaft angle conventionally associated with the Diesel engine, in particular to diagnose leaks from the cylinders thereof.

Strategies for controlling the operation of an engine using a cylinder pressure signal for other engine control functions are also known in the art. Systems using such strategies assume that the acquisition systems are operating correctly and are properly calibrated. Consequently, if at least one acquisition system is faulty, a leak may be diagnosed even though the suspect cylinder(s) are operating satisfactorily, or a malfunction or an increase in pollutant emissions may be caused if the engine management system fails to take account of the fault or drift.

Moreover, in the event of a predetermined fault or drift of the engine or the acquisition systems, the prior art systems referred to above merely deliver a diagnosis for the attention of the user of the vehicle, to enable manual repair or servicing even though, as a general rule, the engine is associated with onboard correction means able to correct such faults and/or drifts.

Additionally, such systems conventionally employ algorithms based on parametric models of the engine or of the changing pressure in the cylinders. Those algorithms generally necessitate a large number of operations, making it difficult to envisage carrying out the corresponding data processing in an onboard computer of the vehicle, which is generally a microcontroller of limited computation capacity.

OBJECTS AND SUMMARY OF THE INVENTION

An object of the present invention is to overcome the problems referred to above by proposing a method of diagnosing the operating state of a motor vehicle diesel engine by testing for correct operation of systems for acquiring the pressure in the cylinders and the engine shaft angle and by identifying malfunctions or drifts in the operating state of the engine based on the changing pressure in the cylinders thereof.

Another object of the invention is to propose a diagnostic method that initiates automatic correction of the malfunctions or drifts referred to above by onboard correction means of the motor vehicle.

To this end, the invention consists in a method of diagnosing the operating state of a motor vehicle diesel engine, the engine comprising a pressure acquisition system associated with each cylinder of the engine to acquire the pressure in that cylinder, an engine shaft angle acquisition system adapted to deliver the crankshaft angle of each cylinder, and onboard correction means adapted to correct a predetermined set of malfunctions and drifts of the cylinders and the acquisition systems, which comprises:

- an analysis step of analyzing the operation of each cylinder and the cylinder pressure and engine shaft angle acquisition systems by identifying an operating state of the set comprising that cylinder and those systems as either a nominal operating state or one of a set of predetermined malfunctions and drifts based on predetermined characteristics of the signal delivered by the cylinder pressure acquisition system; and
- a correction step of correcting identified malfunctions and drifts belonging to the predetermined set of malfunctions and drifts that can be corrected by the onboard correction means.

According to another feature of the invention, the method further comprises a determination step of determining the operating state of each cylinder relative to a predetermined nominal operating state of the cylinder by identifying an operating state of the cylinder as either the predetermined nominal operating state of the cylinder or a predetermined drift operating state of the cylinder based on the evolution of the pressure in the cylinders and is adapted to trigger the analysis step when the determination step determines a drift operating state of a cylinder.

According to another feature of the invention, the analysis step of analyzing the operation of each cylinder and the cylinder pressure and engine shaft angle acquisition systems includes the steps of:

- determining a variation error between the variation of the signal delivered by the pressure acquisition system for a first predetermined range of cylinder crankshaft angles and a predetermined cylinder pressure variation model;
- determining an angle error between the maximum pressure angle of the compression phase of the cylinder cycle and a predetermined model of the maximum pressure angle of the compression phase of the cylinder cycle; and
- identifying the operating state of the cylinder and the cylinder pressure and engine shaft angle acquisition systems based on the variation and angle errors so determined and predetermined ranges of variation errors and maximum pressure angle errors of the compression phase.

According to another feature of the invention, the step of determining the variation error is a step of acquiring a population comprising a predetermined number of values of the variation of the signal delivered by the cylinder pressure acquisition system for the first predetermined range of crankshaft angles and determining the variation error as the difference between the mean value of that population and a predetermined reference value of the pressure variation in the cylinder for the predetermined range of crankshaft angles.

According to another feature of the invention, the step of determining the angle error is a step of acquiring a population comprising a predetermined number of maximum pressure angle values of the compression phase of the cylinder cycle and determining the angle error as the difference between the mean value of that population and a predetermined maximum pressure angle reference value of the compression phase of the cylinder cycle.

According to another feature of the invention, the step of identifying the operating state is a step of identifying the nominal operating state of the cylinder and the cylinder pressure and engine shaft angle acquisition systems if the variation error that has been determined is within a first predetermined range of variation errors and the angle error that has been determined is in a first predetermined range of angle errors.

According to another feature of the invention, the step of identifying the operating state is a step of identifying the nominal operating state of the cylinder and the cylinder pressure and engine shaft angle acquisition systems if the variation error that has been determined is in a first predetermined range of variation errors, the angle error that has been determined is in a first predetermined range of angle errors, the variance of the population of variation values is below a predetermined variation variance threshold, and the variance of the population of angle values if below a predetermined angle variance threshold.

According to another feature of the invention, the step of identifying the operating state of the cylinder and the cylinder pressure and engine shaft angle acquisition systems is a step of identifying a malfunction or a drift in the cylinder and/or the cylinder pressure acquisition system and/or the engine angle acquisition system if the nominal operating state is not identified and determining if the malfunction or drift that has been identified belongs to the predetermined set of malfunctions and drifts correctable by the onboard correction means in the motor vehicle.

According to another feature of the invention the signal is emitted to indicate that a servicing operation is necessary if at least one malfunction is identified as not being correctable by the onboard correction means and the correction step is triggered if at least one malfunction is identified as being correctable by the onboard correction means.

According to another feature of the invention, the step of analyzing the operation of each cylinder and the cylinder pressure and engine shaft angle acquisition systems is triggered after a first engine start or after an engine start following predetermined servicing operations and with the engine idling.

According to another feature of the invention, the step of determining the operating state of each cylinder relative to the predetermined nominal operating state comprises the steps of:

- determining a ratio error between a predetermined ratio model and the ratio of a cylinder pressure variation to the sum of pressure variations in the other cylinders, each of the cylinder pressure variations corresponding to the pressure variation for a second predetermined range of crankshaft angles; and
- identifying a drift operating state of the cylinder as being either the nominal operating state or the drift state operating of the cylinder based on a predetermined range of ratio errors.

According to another feature of the invention, the step of determining a ratio error comprises the steps of:

- acquiring a population comprising a predetermined number of n-plets of pressure variation values for each engine cylinder and for the second range of crankshaft angles, where n is the number of cylinders of the engine;
- generating, for each n-plet, the ratio of the cylinder pressure variation to the sum of the pressure variations in the other cylinders in order to obtain a population of ratios for the cylinder; and
- determining the ratio error as the difference between the mean value of the population of ratios for the cylinder and a predetermined reference ratio value for the cylinder.

According to another feature of the invention, the step of identifying the drift operating state of the cylinder is a step of determining the nominal operating state of the cylinder if the ratio error is in the first predetermined range of ratios.

According to another feature of the invention, the reference cylinder pressure ratio value and the first range of ratio errors are respectively the mean value and a range of confidence of predetermined risk of a Gaussian distribution of the mean value of the cylinder pressure ratio determined after the first engine start.

According to another feature of the invention, the step of determining the drift operating state of each cylinder is triggered if the nominal operating state has been identified for each cylinder and the cylinder pressure and engine shaft angle acquisition systems.

According to another feature of the invention, the step of determining the operating state of each cylinder is triggered regularly.

According to another feature of the invention, it includes a step of evaluating the results of the correction carried out by the onboard correction means and a step of emitting a signal to indicate that a servicing operation is necessary if the evaluation of the results of the correction determines that the correction has failed.

The present invention also consists in a system of the type referred to above for diagnosing the operating state of a diesel engine using the method of the invention.

BRIEF DESCRIPTION OF THE DRAWINGS

The present invention will be better understood after reading the following description, which is given by way of example only and with reference to the appended drawings, in which identical reference numbers designate identical or analogous elements, and in which.

MORE DETAILED DESCRIPTION

Figure 1:
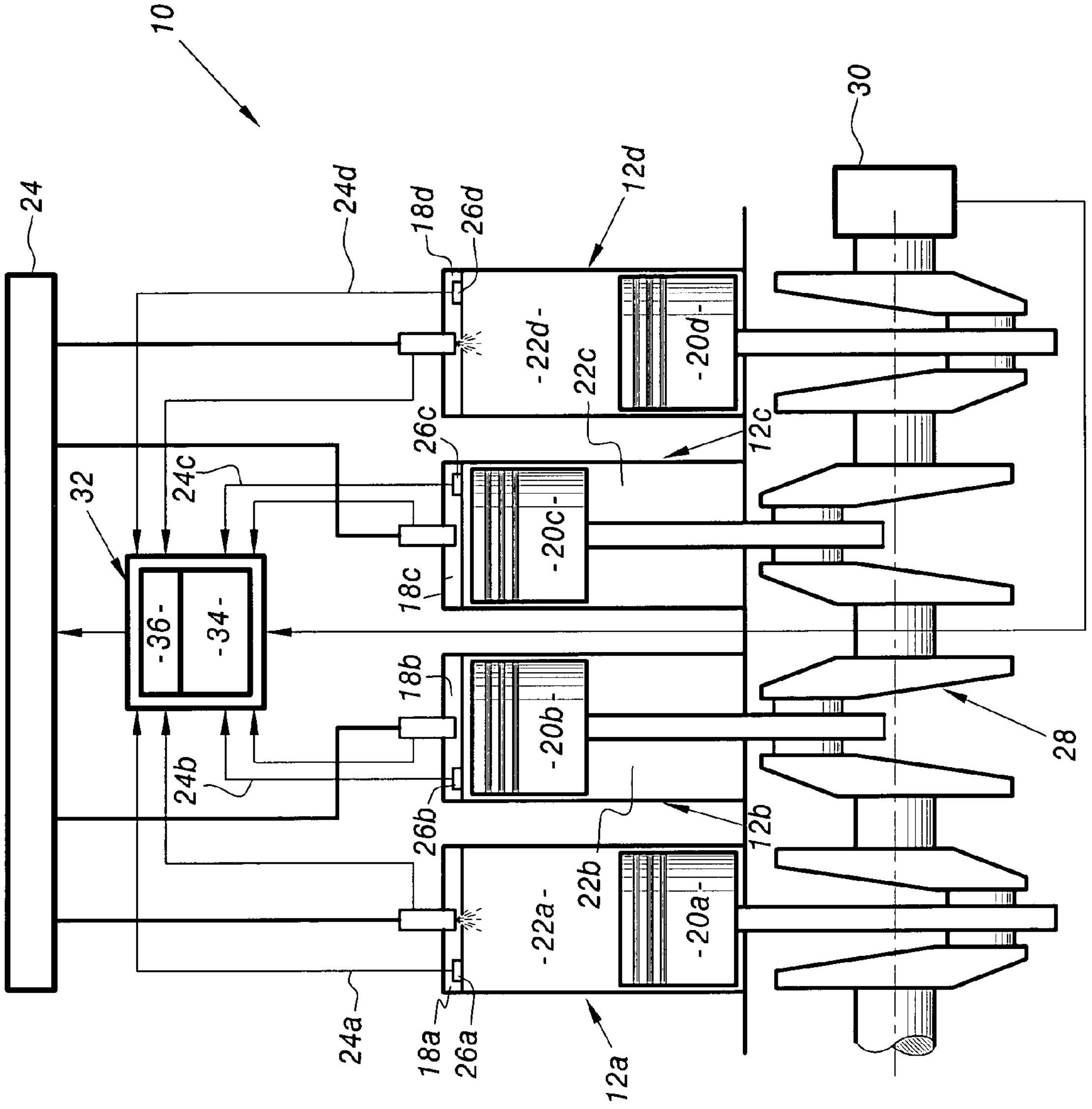
FIG. 1 is a diagram of a diesel engine with a common inlet manifold, or common rail, equipped with systems for acquiring the pressure in the cylinders and the angle of the engine shaft and a unit for controlling the operation of the engine.

FIG. 1 shows a motor vehicle diesel engine 10 incorporating four cylinders 12*a*, 12*b*, 12*c*, 12*d*, for example. Each cylinder of the engine comprises a fuel injector 14*a*, 14*b*, 14*c*, 14*d*, a cylinder head 18*a*, 18*b*, 18*c*, 18*d*, a piston 20*a*, 20*b*, 20*c*, 20*d* and a combustion chamber 22*a*, 22*b*, 22*c*, 22*d* delimited by the piston and the cylinder head. The fuel injector of each cylinder is incorporated in the cylinder head, connected to a common engine inlet manifold 24 and adapted to feed the combustion chamber 22*a*, 22*b*, 22*c*, 22*d* of the cylinder with fuel according at least one pilot fuel injection and one main fuel injection; this is known in the art.

Each cylinder is associated with a system 24*a*, 24*b*, 24*c*, 24*d* for acquiring the pressure in the cylinder and comprising, for example, a deformation sensor 26*a*, 26*b*, 26*c*, 26*d* comprising a piezoelectric element and inserted into the cylinder head or integrated into the glowplug and adapted to measure deformation of the cylinder head caused by variations in the pressure in the combustion chamber of the cylinder. The pistons 20*a*, 20*b*, 20*c*, 20*d* are connected to an engine shaft 28 of the engine 10. The engine shaft 28 is associated with a system 30 for acquiring the engine shaft angle comprising, for example, a Hall-effect sensor associated with a toothed wheel fixed to the engine shaft. This system is further adapted to deliver the crankshaft angle of each cylinder in a manner that is known in the art.

The systems 24*a*, 24*b*, 24*c*, 24*d* for acquiring the pressure in the cylinders and the system 30 for acquiring the engine shaft angle are connected to a unit 32 for controlling the operation of the engine based on the measured cylinder pressures and the measured engine shaft angle. The control unit 32 is connected to the fuel injectors of the engine cylinders and to the common inlet manifold 24 and controls various operating parameters of the engine, for example the injection characteristics, etc., based on the measured pressures and the measured engine shaft angle delivered by the respective acquisition systems.

The control unit 32 comprises onboard malfunction/drift correction means 34 for correcting a predetermined set of malfunctions and drifts of the engine and of the systems for acquiring the cylinder pressures and the engine shaft angle, for example poor calibration of a sensor, poor angular alignment, reversed connections, etc.

Finally, the monitoring unit 32 comprises a unit 36 for diagnosing the operating state of the engine using the method of the invention.

Figure 2:
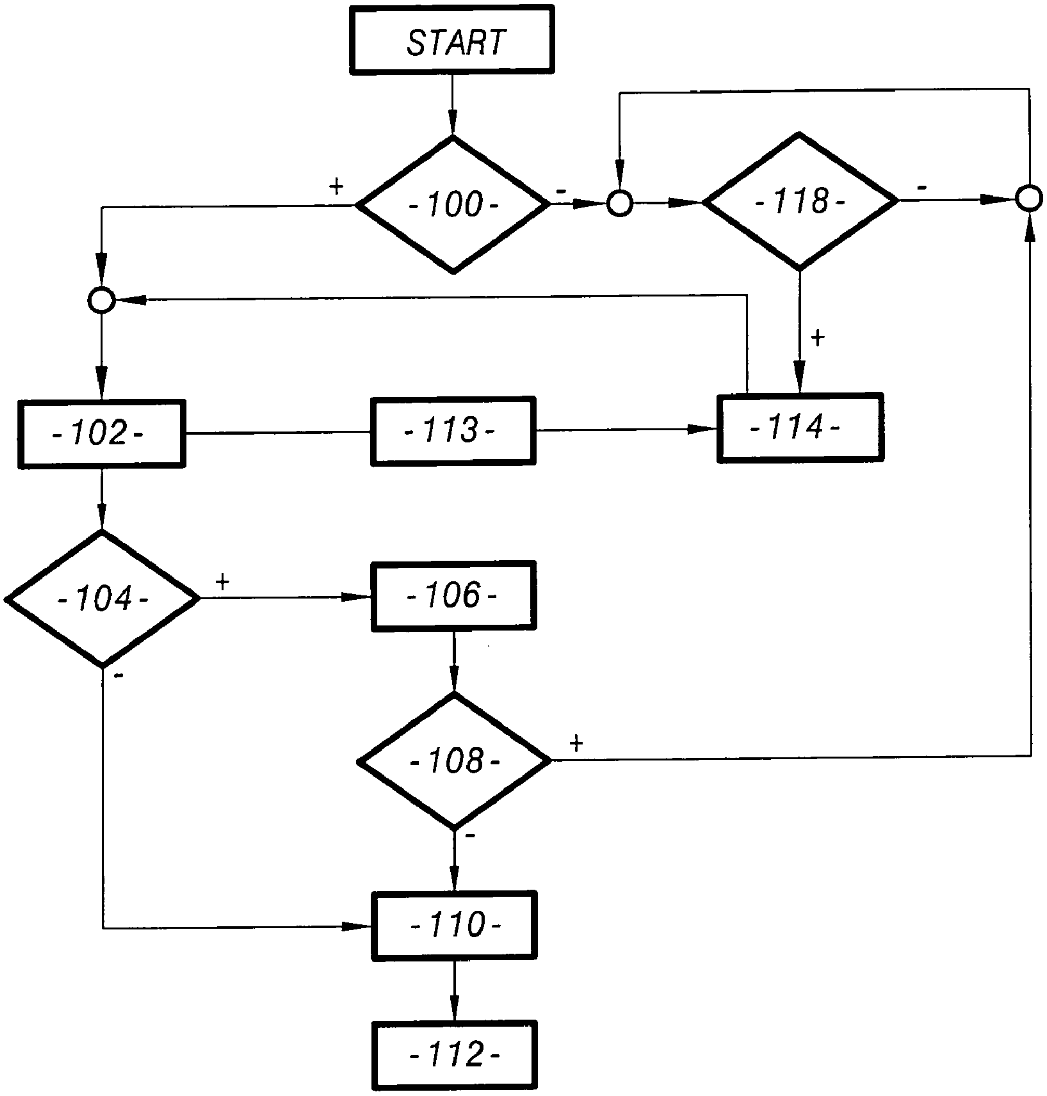
FIG. 2 is a flowchart of main steps of the method of the invention.

FIG. 2 is a flowchart of the method of the invention for diagnosing the operating state of a diesel engine, which method is implemented by the diagnostic unit 36 to control the operation of the engine and is applied here to diagnosing the operating state of the engine shown in FIG. 1.

A first step 100, following starting of the engine 10, tests if this engine start is the first engine start or follows a servicing operation that is one of a predetermined set of servicing operations. If the result of this test is positive, there follows a step 102 of analyzing the operation of each cylinder of the engine and of the systems for acquiring the pressure in that cylinder and the engine shaft angle.

The analysis step 102 is executed when the engine is idling and determines if each set comprising a cylinder, a system for acquiring the pressure in that cylinder, and a system for acquiring the engine shaft angle is operating in a predetermined nominal operating state or is subject to a predetermined drift or malfunction, and identifies the malfunction or drift if the set is not operating nominally; this is explained in more detail hereinafter.

When the engine is started for the first time or following a human servicing operation from the predetermined set of servicing operations, certain malfunctions are liable to occur, for example incorrect electrical connections, a faulty pressure sensor, incorrect angular alignment of the toothed wheel of the system for acquiring the engine shaft angle, a leak from a cylinder, incorrect calibration of a cylinder pressure acquisition system, etc.

If one or more malfunctions or drifts is or are identified in the step 102, a step 104 tests if each identified malfunction or drift belongs to the predetermined set of malfunctions and drifts that the onboard malfunction and drift correction means 34 are able to correct. If each identified malfunction or drift can be corrected by the onboard correction means 34, then the correction means 34 correct the identified malfunction or drift in a non-nominal operating state correction step 106.

Once the correction has been made for each correctable malfunction or drift, a step 108 evaluates the result of the correction. If the result of the evaluation is negative, i.e. if the correction has failed, then a step 110 outputs a signal for the attention of the user of the vehicle, to advise him that a servicing operation is needed. A step 112 following on from the step 110 of issuing the servicing operation signal than sets the engine to a predetermined degraded mode of operation.

If the result of the test carried out in the step 104 is negative, i.e. if an identified malfunction or drift does not belong to the predetermined set of malfunctions and drifts correctable by the onboard correction means 34, then the step 110 that produces the signal indicating that a servicing operation is necessary is executed.

If the analysis process 102 determines the normal operating state for each cylinder and the system for acquiring the pressure therein and the engine shaft angle, and thus the absence of any malfunction, a step 113 determines and stores values to be used in a step 114 of determining the operating state of each cylinder; this is also explained in more detail hereinafter.

The step 114 determines in particular if each cylinder is operating in its nominal state and, if this is not the case, diagnoses an operating state affected by drift.

This drift operating state of a cylinder is therefore diagnosed after the pressure and engine shaft angle acquisition systems have been diagnosed as operating in a satisfactory manner; this diagnosis is therefore not falsified by any acquisition system component that is faulty or whose operation is unsatisfactory.

Once the step 114 has been completed, if drift in the operation of a cylinder has been diagnosed, in order to identify that drift, the method loops to the step 102 of analyzing the operation of the cylinder and the systems for acquiring the pressure in the cylinder and the engine shaft angle.

In the event of a negative result to the test step 100 of the method for determining if the engine start is the first engine start or follows on from a servicing operation that is one of the predetermined set of servicing operations, a step 118 tests a condition for triggering the step 114 of determining the drift state of each cylinder. For example, the step 118 tests if the number of kilometers traveled by the vehicle since the last drift determination is greater than or equal to a predetermined number. The step 118 also tests if the unit 32 for controlling the operation of the engine has made an error that is one of a predetermined list of errors that includes, for example, faults of the control unit 32 that produce incoherent engine control regulation values based on cylinder pressure signals delivered by the systems for acquiring the cylinder pressures.

If the result of this test is negative, testing continues until the triggering condition is satisfied. If the result of this test is positive, then the determination step 114 is executed.

Finally, if the result of evaluating the results of the non-nominal state correction executed in the step 108 is positive, the step 118 of testing the triggering condition of the step 114 of determining drifts is then triggered.

The step 102 of analyzing the operation of each cylinder of the engine and the systems for acquiring the pressure in that cylinder and the engine shaft angle are described next with reference to FIGS. 3 and 4.

The analysis step 102 is executed sequentially, cylinder by cylinder, with the engine idling and with the pilot injection eliminated for the cylinder being diagnosed and with the main injection detuned so that combustion begins at a crankshaft angle of more than 5° after the top dead center point and/or with exhaust gas recirculation (EGR) eliminated if the accuracy of the determination and identification of malfunctions and drifts is better on the type of vehicle to which the method of the invention is being applied, as determined by a statistical study carried out beforehand.

The step 102 first analyses simultaneously the amplitude of the signal delivered by the system for acquiring the pressure in the cylinder and the maximum pressure angle of the cylinder cycle compression curve (APMC). To be more specific, during the compression phase of the cylinder cycle, the value of the signal delivered by the system for acquiring the cylinder pressure and the value of the engine shaft angle delivered by the system for acquiring the engine shaft angle are acquired, in order to obtain the evolution of the signal delivered by the acquisition system as a function of the crankshaft angle of the cylinder.

Searching directly for the maximum value of the signal delivered by the cylinder pressure acquisition system is generally inaccurate because a small variation in pressure in the immediate vicinity of the top dead center point of the cylinder cycle may be swamped by measurement noise.

The step 102 first samples the signal delivered by the acquisition system in a predetermined crankshaft angle window of ±5° around an estimate of the dead center point, to obtain a sampled curve.

The step 102 then determines the center of symmetry of this curve, i.e. the APMC, for example using the least squares method to fit a second degree polynomial to the sampled data of the curve and then determine the position of the maximum of that polynomial and thus the APMC.

Determining the APMC using the least squares method has the advantage of requiring very little calculation. This maximum position value can be expressed in polynomial form. If $x_i$ are the angle values at the sampling points and $y_i$ the pressure values at those points and if the samples are taken symmetrically about the zero point so that $$\sum_{i=1}^{N} x_i = 0 \text{ and } \sum_{i=1}^{N} x_i^3 = 0,$$

then the step 102 determines the APMC from the following equation:

$$APMC = \frac{-\sum_{i=1}^{N} x_i y_i \left( N.\sum_{i=1}^{N} x_i^4 - \left( \sum_{i=1}^{N} x_i^2 \right)^2 \right)}{\left( N.\sum_{i=1}^{N} x_i^2 y_i - \sum_{i=1}^{N} x_i^2 . \sum_{i=1}^{N} y_i \right)}$$

The amplitude analysis compares the variation $\Delta S = S(\alpha_2) - S(\alpha_1)$ of the value S of the signal delivered by the cylinder pressure acquisition system between two predetermined crankshaft angles $\alpha_1$ and $\alpha_2$ of the compression phase of the cylinder cycle to a predetermined value corresponding to a pressure variation representative of a set of engines of the family of the diesel engine to which the method of the invention is being applied.

In an analogous manner, analyzing the maximum pressure angle of the compression curve compares the observed APMC of the cylinder to a predetermined value corresponding to a maximum pressure angle of the compression phase representative of all the engines of the family of the diesel engine to which the method of the invention is being applied.

Populations of pressure variations between the crankshaft angles $\alpha_1$ and $\alpha_2$ APMC are observed beforehand for the cylinders of all the engines in various states of wear and various operating conditions, but with the cylinders and acquisition systems operating in the nominal state. For conciseness, an engine cylinder associated with cylinder pressure acquisition and engine shaft angle acquisition systems operating in the nominal state are referred to hereinafter as a nominal cylinder set. The statistical study also determines if canceling the EGR (see above) usefully improves the accuracy of diagnosis for the type of diesel engine being diagnosed using the method of the invention.

A statistical study of the pressure variation population obtained in this way establishes that, for a nominal cylinder set and between the predetermined crankshaft angles $\alpha_1$ and $\alpha_2$ of the compression phase, the pressure increase is a Gaussian random variable of mean value $m_{\Delta P}$ and variance $\sigma_{\Delta P}^2$. In an analogous manner, a statistical study of the APMC population acquired in this way establishes that the APMC for a nominal cylinder set is a Gaussian random variable of mean value $m_{\Delta P}$ and variance $\sigma_{\Delta P}^2$.

Figure 3:
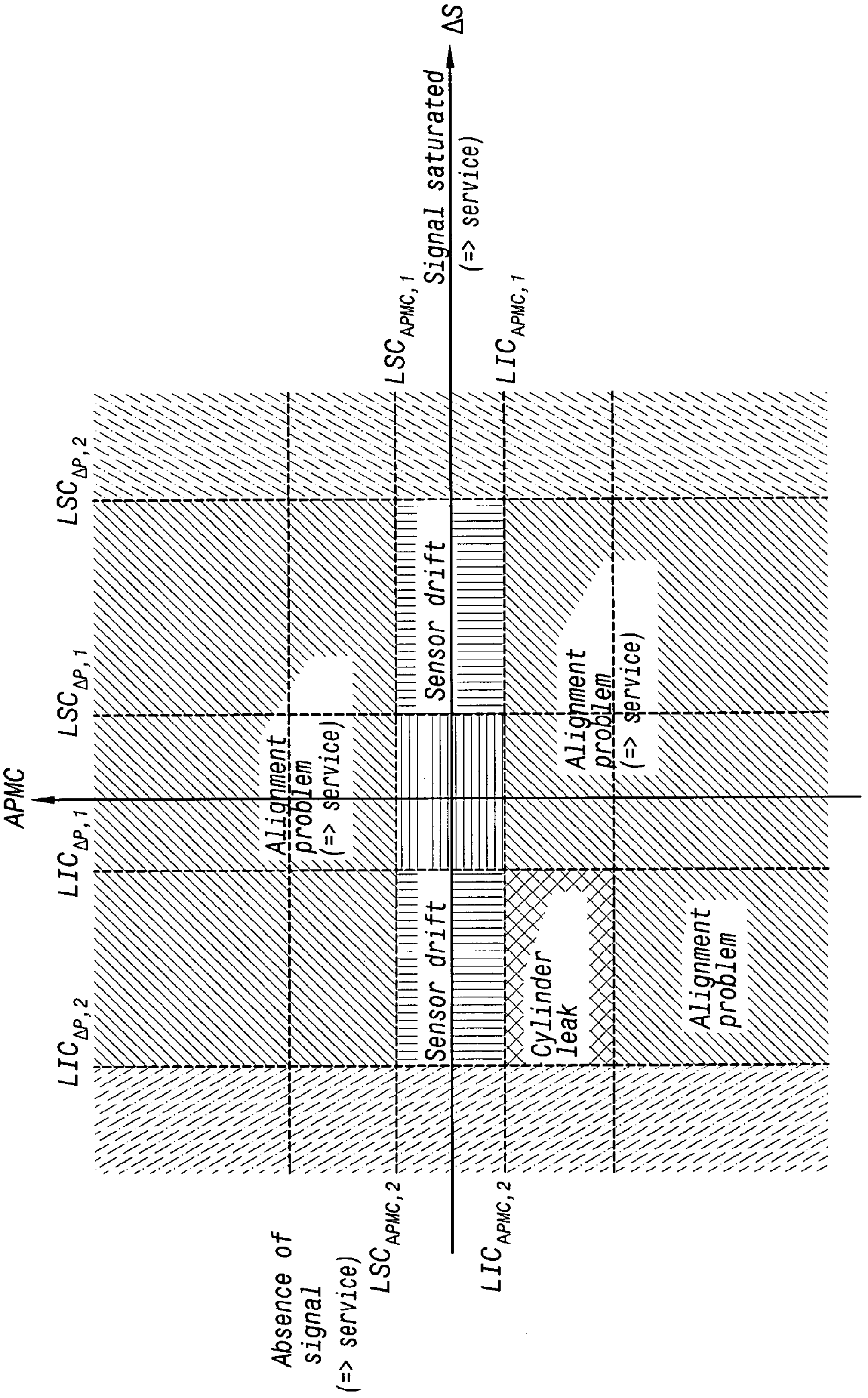
FIG. 3 is a chart for diagnosing the operating state of the cylinders and the systems for acquiring the pressure in the cylinders and the engine shaft angle.

FIG. 3 is one partition of a diagnostic chart obtained during the preliminary statistical study. This chart characterizes the operation of the cylinder and the systems for acquiring the pressure therein and the engine shaft angle as a function of errors of that set relative to the pair of values $(m_{\Delta P}, m_{APMC})$ representative of the nominal operating state.

This diagnostic chart has an orthogonal system of axes with its origin at $(m_{\Delta P}, m_{APMC})$ and whose abscissa axis plots the mean value of an observed population of N variations $\Delta S^{obs}$ of the value of the signal delivered by the cylinder pressure acquisition system between the crankshaft angles $\alpha_1$ and $\alpha_2$, from which the value $m_{\Delta P}$ is subtracted, and whose ordinate axis plots the mean value of an observed population of M maximum pressure angles of the compression curve $APMC^{obs}$ of the cylinder, from which the value $m_{APMC}$ is subtracted, where M and N are predetermined numbers.

The abscissa axis is divided into the following five segments: $S_{\Delta P,1} = \rfloor -\infty; LIC_{\Delta P,2} \rfloor$, $S_{\Delta P,2=} \rfloor LIC_{\Delta P,2}; LIC_{\Delta P,1} \rfloor$, $S_{\Delta P,3=} \rfloor LIC_{\Delta P,1}; LSC_{\Delta P,1} \rfloor$, $S_{\Delta P,4=} \rfloor LSC_{\Delta P,1}; LSC_{\Delta P,2} \rfloor$ and $S_{where\ LIC} \Delta P,1$ and $LSC_{\Delta P,1}$ are respectively the lower limit and the upper limit of a first predetermined range of confidence, of risk $r_{\Delta P,1}$, and $LIC_{\Delta P,2}$ and $LSC_{\Delta P,2}$ are respectively the lower and upper limits of a second predetermined range of confidence, of risk $r_{\Delta P,2}$, for a random variable, conforming to the following equation, in which $\hat{x}_i$, i=1, . . . , N, is a Gaussian random variable of mean value $m_{\Delta P}$ and variance $\sigma_{\Delta P}^2$:

$$\hat{X} = \frac{1}{N} \sum_{i=1}^{N} \hat{x}_i - m_{\Delta P}$$

The ordinate axis is also divided into five segments, as follows: $S_{APMC,1} = \rfloor -\infty; LIC_{APMC,2} \rfloor$, $S_{APMC,2} = \rfloor LIC_{APMC,2}; LIC_{APMC,1} \rfloor$, $S_{APMC,3=} \rfloor LIC_{APMC,1}; LSC_{APMC,1} \rfloor$, $S_{APMC,4=} \rfloor LSC_{APMC,1}; LSC_{APMC,2} \rfloor$ and $S_{APMC,}$ $S_{APMC,5}$=]$LSC_{APMC,2}$; +∞[, in which $LIC_{APMC,1}$ and $LSC_{APMC,1}$ are respectively the lower and upper limits of a predetermined first range of confidence, of risk $r_{APMC,1}$, and $LIC_{APMC,2}$ and $LSC_{APMC,2}$ are respectively the lower and upper limits of a predetermined second range of confidence, of risk $r_{APMC,2}$, for the random variable, conforming to the following equation, in which $\hat{y}_i$, i=1, . . . , M, is a random variable of mean value $m_{APMC}$ and variance $\sigma_{APMC}^2$:

$$\hat{Y} = \frac{1}{M}\sum_{i=1}^{M} \hat{y}_i - m_{AMPC}$$

Remember that a range of confidence [LIC; LSC], of risk α, associated with a Gaussian random variable $$\hat{W} = \frac{1}{N}\sum_{i=1}^{N} \hat{w}_i,$$

where $\hat{w}_i$, i=1, . . . , N, is a Gaussian random variable of mean value $m_w$ and variance $\sigma_w^2$, is the range $$\left[m_w - t_\alpha\frac{\sigma_w}{\sqrt{N}};\, m_w + t_w\frac{\sigma_w}{\sqrt{N}}\right],$$

where $t_\alpha$ is a number such as the probability $P(G<t_\alpha)$ that an instance G of the reduced central Gaussian random variable $\hat{G}$ will be equal to $$1 - \frac{\alpha}{2}.$$

Each of the predetermined ranges $S_{\Delta P,i}\times S_{APMC,j}$, i=1, 2, . . . , 5; j=1, 2, . . . , 5 is representative of a predetermined operating state of the cylinder and the systems for acquiring the cylinder pressure and the engine shaft angle, i.e. the nominal state, a predetermined malfunction or a predetermined drift.

The central range $S_{\Delta P,3}\times S_{APMC,3}$ is representative of the nominal operating state. If the operation of the cylinder and the associated acquisition systems is such that the pair (X,Y), consisting of an instance of the variable $\hat{X}$ and an instance of the variable $\hat{Y}$, respectively, differs from the pair ($m_{\Delta P}$, $m_{APMC}$) by an amount such that it is within the range $S_{\Delta P,3}\times S_{APMC,3}$, then the diagnosis is that the cylinder and the associated acquisition systems are operating in the nominal operating state and are therefore not subject to any malfunction or drift.

The other ranges correspond to a non-nominal operating state. Each of them is representative of a malfunction or drift from a predetermined set of malfunctions and drifts. More particularly:

- the ranges $S_{\Delta P,2}\times S_{APMC,3}$ and $S_{\Delta P,4}\times S_{APMC,3}$ indicate drift of the cylinder pressure acquisition system, whose calibration is no longer satisfactory and which is delivering a pressure measurement that is not representative of the real value of the pressure in the cylinder;
- the range $S_{\Delta P,2}\times S_{APMC,2}$ indicates a leak from the cylinder;
- the ranges $S_{\Delta P,1}\times S_{APMC,i}$, i=1, . . . , 5, indicate absence of the signal delivered by the pressure acquisition system;
- the ranges $S_{\Delta P,5}\times S_{APMC,i}$, i=1, . . . , 5, indicate saturation of the pressure acquisition system; and
- the other ranges indicate a problem with the angular alignment of the engine angle shaft acquisition system.

The risks $r_{\Delta P,1}$ and $r_{APMC,1}$ are advantageously equal to 1%. Accordingly, if the mean value of a population of observed variations of the signal delivered by the cylinder pressure acquisition system is not within the range $S_{\Delta P,3}$, then there is a probability of less than 1% that the cylinder and the associated acquisition systems are not operating as a nominal cylinder set characterized by a Gaussian pressure variation, of mean value $m_{\Delta p}$ and of variance $\sigma_{\Delta P}^2$. In an analogous manner, if the mean value of a population of observed APMC is not within the range $S_{APMC,3}$, then there is a probability of less than 1% that the cylinder and the associated acquisition systems are not operating as a nominal cylinder set characterized by a Gaussian APMC, of mean value $m_{APMC}$ and of variance $\sigma_{APMC}^2$.

Figure 4:
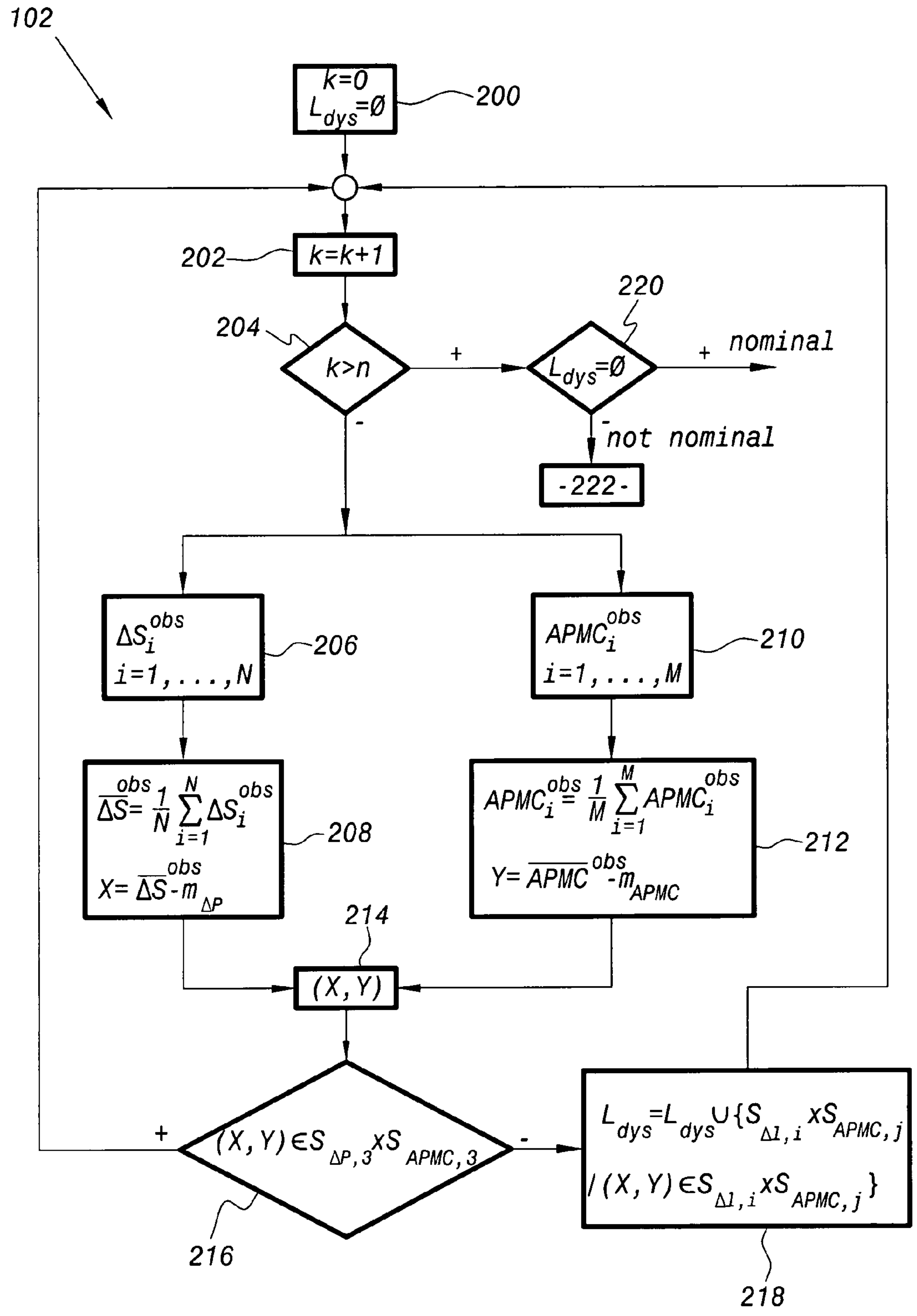
FIG. 4 is a flowchart of a step of the method of the invention that analyses the operation of each cylinder of the engine and the systems for acquiring the pressure in that cylinder and the engine shaft angle.

FIG. 4 is a flowchart of the step 102 of analyzing the operation of each engine cylinder and the systems for acquiring the pressure in that cylinder and the engine shaft angle.

Following on from the step 100 of the method of the invention described with reference to FIG. 1, and with the engine idling, an initialization step 200 resets a cylinder counter k and a list $L_{mal}$ of malfunctions/drifts. The cylinder counter k is incremented by a unit increment of one in a subsequent step 202 and a test is then carried out in a step 204 to determine if the value of the counter k exceeds the total number n of cylinders in the engine.

If the result of this test is negative, a step 206 cancels the pilot injection to the cylinder being diagnosed and if necessary detunes the main injection cycle so that combustion of the fuel in the main injection cycles begins at a crankshaft angle lagging the top dead center point by more than 5°, and may eliminate exhaust gas recycling if this improves the accuracy of the diagnosis, as explained above. The step 206 then acquires a population $\{\Delta S_i^{obs};\ i=1, \ldots, N\}$ of N variations of the signal delivered by the system for acquiring pressure in the $k^{th}$ cylinder of the engine between the crankshaft angles $\alpha_1$ and $\alpha_2$ of the compression phase of the cylinder cycle.

The mean value $$\overline{\Delta S^{obs}} = \frac{1}{N}\sum_{i=1}^{N} \Delta S_i^{obs}$$

of this population is then generated in a step 208 together with a value for X obtained from the equation $X=\overline{\Delta S^{obs}}-m_{\Delta P}$.

If the result of the test on the value of the cylinder counter k is negative, a step 210 acquires a population $\{APMC_i^{obs};\ i=1, \ldots, M\}$ of M APMC for the $k^{th}$ cylinder of the engine. The mean value $$\overline{APMC^{obs}} = \frac{1}{M}\sum_{i=1}^{M} APMC_i^{obs}$$

is then generated in a successive step 212 together with a value for Y obtained from the equation $Y=\overline{APMC^{obs}}-m_{APMC}$.

A step 214 which is triggered when the steps 208 and 212 have been completed then generates the pair of values (X,Y) for the $k^{th}$ cylinder and a step 216 then tests if this pair belongs to the predetermined range $S_{\Delta P,3}\times S_{APMC,3}$ representative of the nominal operating state of the set formed of the $k^{th}$ cylinder and the systems for acquiring the pressure therein and the engine shaft angle.

If the result of this test on the value of the pair (X,Y) is positive, there is then a loop to the step 202 in order to test the next cylinder. If the result of this test is negative, i.e. if a malfunction or a drift is determined for the set consisting of the $k^{th}$ cylinder and the systems for acquiring the pressure in the $k^{th}$ cylinder and the engine shaft angle, a step 218 identifies a malfunction or a drift as a function of the predetermined range to which the pair of values (X,Y) belongs, and then updates the list $L_{mal}$ of malfunctions/drifts by adding to it the malfunction or the drift that has been identified in this way. There is than a loop to the step 202.

If the results of the test on the value of the cylinder counter k is positive, i.e. if all the sets consisting of a cylinder and the systems for acquiring the pressure in that cylinder and the engine shaft angle have been tested, a step 220 tests the state of the list $L_{mal}$ of malfunctions and drifts. If the list $L_{mal}$ is empty, i.e. if no malfunction and no drift have been identified, then the nominal operating state of the cylinders and acquisition systems is diagnosed. If not, a non-nominal operating state is diagnosed and the list $L_{mal}$ of malfunctions and drifts is used in a step 222 to identify malfunctions and drifts that can be corrected by the onboard correction means. To this end, the method determines if each malfunction or each drift listed in the list $L_{mal}$ belongs to the set of malfunctions and drifts that may be corrected by the onboard correction means.

In another embodiment of the method of the invention, the step 216 of testing to determine if the pair of values (X,Y) belongs to the predetermined range $S_{\Delta P,3}\times S_{APMC,3}$ tests also if the variance $\sigma_{\Delta S\_obs}{}^2$ of the population $\{\Delta S_i{}^{obs}; i=1, \ldots, N\}$ and the variance $\sigma_{APMC\_obs}{}^2$ of the population $\{APMC_i{}^{obs}; i=1, \ldots, M\}$ of the $k^{th}$ cylinder are less than predetermined variance values $LSC_{var\_\Delta P}$ and $LSC_{var\_APMC}$, respectively. If the pair (X,Y) belongs to $S_{\Delta P,3}\times S_{APMC,3}$ and, at the same time, the variance $\sigma_{\Delta S\_obs}{}^2$ is less than $LCS_{var\_\Delta P}$ and the variance $\sigma_{APMC\_obs}{}^2$ is less than $LSC_{var\_APMC}$, then the nominal operating state of the $k^{th}$ cylinder and the systems for acquiring the pressure in the $k^{th}$ cylinder and the engine shaft angle is diagnosed. Thus simultaneously testing the mean value and the variance of the populations $\{\Delta S_i{}^{obs}; i=1, \ldots, N\}$ and $\{APMC_i{}^{obs}; i=1, \ldots, M\}$ improves the ability of the method to diagnose the nominal operating state.

The APMC of a nominal cylinder set being a Gaussian random variable of mean value $m_{APMC}$ and variance $\sigma_{APMC}{}^2$, it is known that the random variable conforming to the following equation:

$$(M-1)\frac{\sigma^2_{\mathrm{APMC\_obs\_nom}}}{\sigma^2_{APMC}}$$

follows a chi-squared law with M−1 degrees of freedom, where $\sigma_{APMC\_obs\_nom}{}^2$ is the estimated variance of a population of M APMC of a nominal cylinder set. It is therefore possible to determine a threshold value $LSC_{var\_APMC}$ of confidence, of predetermined risk $r_{var\_APMC}$, for example 1%, based on the chi-squared law, from the equation:

$$LSC_{\mathrm{var}-APMC}=\frac{\chi^2_{M-1}(1-r_{\mathrm{var\_APMC}})}{M-1}\sigma^2_{\mathrm{APMC\_obs\_nom}}$$

in which $\chi_{M-1}{}^2$ is the inverse function of the cumulative distribution function of the chi-squared law with M−1 degrees of freedom.

In an analogous manner, a threshold value of confidence $LSC_{var\_\Delta P}$, of predetermined risk, for example 1%, is determined for the variance of the population $\{\Delta S_i{}^{obs}; i=1, \ldots, N\}$.

Figure 5:
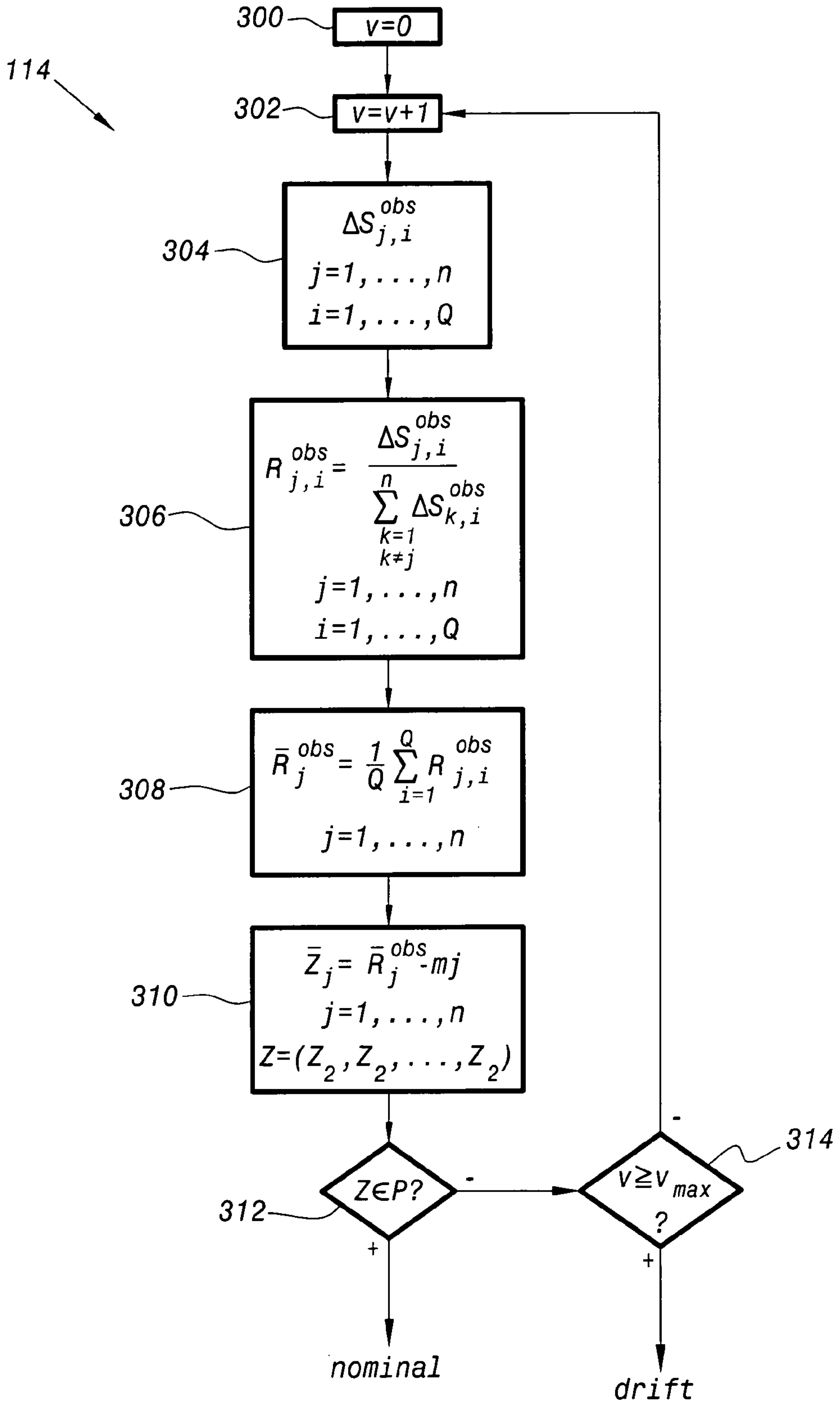
FIG. 5 is a flowchart of a step of the method of the invention that determines drifts in the operating state of each cylinder relative to a predetermined nominal operating state of the cylinder.

The process for determining the operating state of each cylinder relative to the predetermined nominal operating state of the cylinder by the method of the invention is described next with reference to FIG. 5.

A step 300 initializes a counter v to zero and a step 302 then increments the value of the counter v by a unit increment of one.

A step 304 acquires a population of a predetermined number Q of n-plets $$\{(\Delta S^{obs}_{1,i}, \Delta S^{obs}_{2,i}, \ldots, \Delta S^{obs}_{n,i})_i; i=1, \ldots, Q\},$$

where $$\Delta S^{obs}_{j,i},$$

j=1, . . . , N, i=1, . . . , Q is an $i^{th}$ observed variation of the value of the signal delivered by the system for acquiring the pressure in the $j^{th}$ cylinder between two predetermined crankshaft angles $\alpha_3$ and $\alpha_4$ of the compression phase of the cylinder cycle. Each n-plet is acquired during a cycle of the engine shaft, for example.

A step 306 then generates for each n-plet of the population, and for each cylinder, a ratio conforming to the following equation:

$$R^{obs}_{j,i}=\frac{\Delta S^{obs}_{j,i}}{\sum\limits_{\substack{k=1\\k\neq j}}^{n}\Delta S^{obs}_{k,i}}\quad j=1, \ldots N, i=1, \ldots, Q$$

There is obtained in this way a population of Q n-plets of ratios $$\{(R^{obs}_{1,i}, R^{obs}_{2,i}, \ldots, R^{obs}_{n,i}); i=1, \ldots, Q\}.$$

The next step 308 forms the n-plet of mean values of ratios ($\overline{R}_1^{obs}$, $\overline{R}_2^{obs}$, . . . , $\overline{R}_n^{obs}$), where $$\overline{R}_j^{obs} = \frac{1}{Q}\sum_{i=1}^{Q} R_{j,i}^{obs},$$

j=1, . . . , n is the mean value of the ratios relating to the $j^{th}$ cylinder.

A step 310 then generates the n-plet Z=($Z_1$, $Z_2$, . . . , $Z_n$), where $Z_j=\overline{R}_j^{obs}-m_j$, j=1, . . . , n and $m_j$ is a predetermined reference ratio value indicating nominal operation of the $j^{th}$ cylinder.

The next step 312 of the method of the invention tests if the n-plet Z belongs to a first predetermined range $P_1$ indicating the nominal operating state of all the engine cylinders. The range $P_1$ is centered on the n-plet ($m_1$, $m_2$, . . . , $m_n$) and is equal to:

$\lfloor LIC_{R,1}\ LSC_{R,1}\rfloor \times \lfloor LIC_{R,2}\ LSC_{R,2}\rfloor \times \ldots \times \lfloor LIC_{R,n}\ LSC_{R,n}\rfloor$ where $\lfloor LIC_{R,j}\ LSC_{R,j}\rfloor$, j=1, . . . , n is a predetermined range indicating the nominal operating state of the $j^{th}$ cylinder and $LIC_{R,j}$ and $LSC_{R,j}$ are the lower and upper limits, respectively, of a predetermined range of confidence, of predetermined risk rj, associated with a Gaussian random variable indicating the nominal operating state of the $j^{th}$ cylinder, as explained in detail hereinafter. A cylinder j is then diagnosed as not operating in the nominal operating state if the $j^{th}$ component of the n-plet Z is not in the range $\lfloor LIC_{R,j}\ LSC_{R,j}\rfloor$.

If the nominal operating state of all cylinders is not diagnosed in the step 312, i.e. if the n-plet ($Z_1$, $Z_2$, . . . , $Z_n$) does not belong to the range $P_1$, a test is executed in a step 314 to determine if the value of the counter v is greater than or equal to a predetermined value $v_{max}$. If the result of this test is negative, there is a loop to the step 302.

If the result of this test is positive, i.e. if $v_{max}$ successive diagnoses have determined that at least one cylinder is not operating in the nominal operating state, a state of drift of that cylinder, and in the final analysis of the engine, is diagnosed. There is than a loop to the step 102 described above for drift identification in the manner described above.

It may be seen that the determination step 114 comprises fewer calculation and acquisition operations than the analysis step 102. It is therefore particularly advantageous to use a determination step of this kind to diagnose drift, rather than to execute the analysis step 102 systematically.

The ratio reference values $m_j$ and the associated confidence ranges are determined during a step 113 shown in FIG. 2.

Following the first engine start or a manual servicing operation from the predetermined set of servicing operations, if the process step 102 determines that the cylinders and the systems for acquiring the cylinder pressures and the engine shaft angle are operating in the nominal operating state, i.e. with no malfunction or drift, the step 113 acquires a population of T n-plets of ratios $$\{(R_{1,i}^{obs}, R_{2,i}^{obs}, \ldots, R_{n,i}^{obs});\ i = 1, \ldots, T\}$$

for the angles $\alpha_3$ and $\alpha_4$ of the compression phase of the cylinder cycle in a manner analogous to the steps 304 and 306 described above in relation to FIG. 5, and where T is a predetermined number.

The step 113 then determines the n-plet of mean ratio values ($\overline{R}_1^{obs}$, $\overline{R}_2^{obs}$, . . . , $\overline{R}_n^{obs}$) of this population in a manner analogous to the step 308 described above and registers this n-plet as the n-plet ($m_1$, $m_2$, . . . , $m_n$) of ratio reference values.

The step 113 also determines the n-plet of variances of the ratios $(\sigma_{R_1}^2, \sigma_{R_2}^2, \ldots, \sigma_{R_n}^2)$ of this population, where $\sigma_{Rj}^2$ is the variance of the ratios relating to the $j^{th}$ cylinder, and then determines the set of ranges of confidence $\{\lfloor LIC_{R,j}\ LSC_{R,j}\rfloor,\ j=1, 2, \ldots, n\}$ as a function of those variances from the equation $$[LIC_{R,j}LSC_{R,j}] = \left[-t_j\frac{\sigma_{R_j}}{\sqrt{N}};\ t_j\frac{\sigma_{R_j}}{\sqrt{N}}\right],$$

in which $t_j$ is a number such as the probability $P(G<t_j)$ that an instance G of the reduced central Gaussian random variable $\hat{G}$ is equal to $$1 - \frac{r_j}{2}.$$

The crankshaft angles $\alpha_3$ and $\alpha_4$ are advantageously equal to the crankshaft angles $\alpha_1$ and $\alpha_2$, respectively, so that it is possible to use the populations of variations of the signals delivered by the cylinder pressure acquisition systems acquired during the step 206 of the step 102 described with reference to FIG. 4 to calculate the ratio reference values and the ranges of confidence in the manner described above. There is then no variation population acquisition step, which speeds up the method of the invention.

The statistical test applied to the variation ΔS of the signal delivered by a cylinder pressure acquisition system, for example that for the $j^{th}$ cylinder, used in the steps 206, 208 and 214 described with reference to FIG. 1, may be replaced by the test relating to the ratio $\overline{R}_j^{obs}$, the principle of the process remaining the same.

Figure 6:
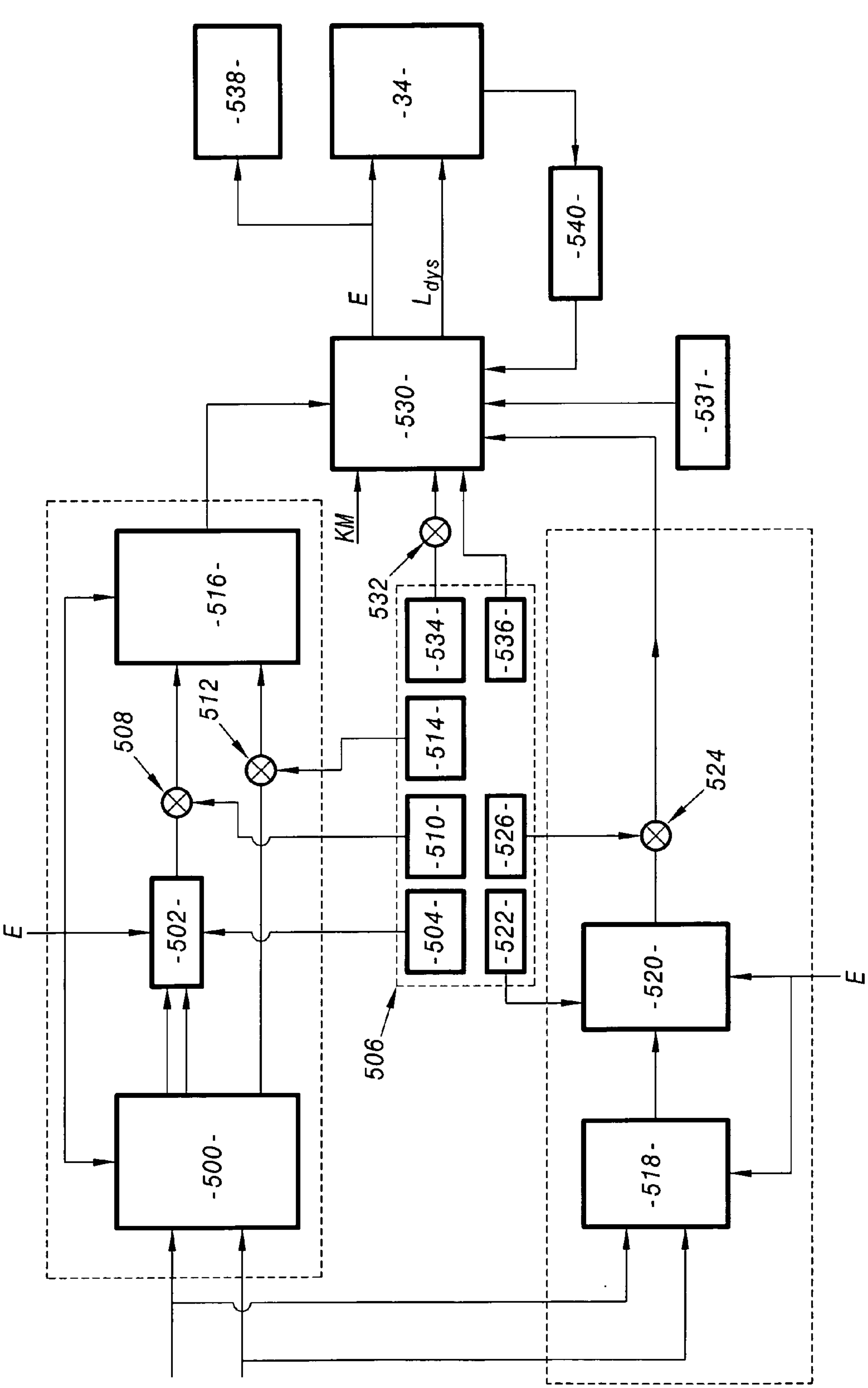
FIG. 6 is a diagram of a preferred embodiment of an operating state diagnostic unit included in the system shown in FIG. 1.

A preferred embodiment of the unit 36 for diagnosing the operating state of the unit 32 for controlling the operation of the engine included in the FIG. 1 system and carrying out the method of the invention as described above with reference to FIGS. 2 to 5 is described next with reference to FIG. 6.

Means 500 for acquiring mean values and variances of populations of signal variations delivered by a pressure and of APMC receive as input the signals delivered by the cylinder pressure and engine shaft angle acquisition systems. The average value and variance acquisition means 500 determine, for each engine cylinder, the mean value $\overline{\Delta S}^{obs}$ and the variance $\sigma_{\Delta S\_obs}^2$ of a population of N observed variations of the value of the signal delivered by the cylinder pressure acquisition system by means of the steps 206 and 208 described with reference to FIG. 4 and the mean value $\overline{APMC}^{obs}$ and the variance $\sigma_{APMC\_obs}^2$ of a population of M observed APMC by means of the steps 210 and 212 described with reference to FIG. 4.

The value of the mean values is then supplied to pair generation means 502 that are further connected to receive a list 504 of reference mean values $m_{\Delta P}$ and $m_{APMC}$ from a non-volatile memory 506. Means 502 are adapted to generate a pair of values (X,Y) as a function of the values of the average values received as input and the reference mean values by means of the step 214 described above with reference to FIG. 4.

The pair (X,Y) is then supplied to first comparison means 508 that receive at a second input a set of ranges $S_{\Delta P,i}$ and $S_{APMC,j}$ from a list 510 of the ranges $S_{\Delta P,i}$ and $S_{APMC,j}$ in the non-volatile memory 506. Also, the variances $\sigma_{\Delta S\_obs}^2$ and $\sigma_{APMC\_obs}^2$ are supplied to second comparison means 512 that also receive values $LCS_{var\_\Delta P}$ and $LSC_{var\_APMC}$ from a list 514 of variance threshold values in the non-volatile memory 506.

The first comparison means 508 determine to which range the pair (X,Y) belongs and the second comparison means 512 determine if each of the variances is below the associated variance threshold value. The first and second comparison means determine in particular if the set consisting of the cylinder and the associated acquisition systems is operating in the nominal operating state characterized by the range $S_{\Delta P,3}\times S_{APMC,3}$ and by variances below their respective threshold value by means of the step 216 described above with reference to FIG. 4.

The results of the above comparisons are then supplied to means 516 for identifying malfunctions and drift which comprise means (not shown) for storing the list $L_{mal}$ of malfunctions and drifts and update this list as a function of the comparison results by means of the step 218 described with reference to FIG. 4.

The system of the invention further comprises means 518 for acquiring ratio mean values and receiving as inputs the signals delivered by the cylinder pressure and engine shaft angle acquisition system. The acquisition means 518 are adapted to acquire an n-plet of ratio mean values ($\overline{R}_1^{obs}$, $\overline{R}_2^{obs}$, . . . , $\overline{R}_n^{obs}$) using the steps 304, 306 and 308 of the method of the invention described above with reference to FIG. 5.

The means 518 supply the n-plet of ratio mean values to n-plet generation means 520 which further receive as second input ratio reference values $m_1$, $m_2$, . . . , $m_n$ from a list 522 of ratio reference values in the non-volatile memory 506. The generation means 520 then respond by generating the n-plet $Z=(Z_1, Z_2, \ldots, Z_n)$ as a function of the input that it receives using the step 310 of the method of the invention.

The n-plet ($Z_1$, $Z_2$, . . . , $Z_n$) generated in this way is supplied to third comparison means 524 that determine if that n-plet belongs to a range P1 received as second input from a list 526 of confidence ranges in the non-volatile memory 506.

The malfunction and drift identification means 516 and the third comparison means 524 are connected to central control means 530 that are also connected to means 532 for identifying the type of engine start. By means of the step 100, the engine start type identification means 532 determine if an engine start is the first engine start or follows on from a servicing operation belonging to a predetermined list 534 of servicing operations stored in the non-volatile memory 506, and returns the result of this determination to the central control means 530.

The central control means 530 further receive as input the number KM of kilometers traveled by the motor vehicle and are also connected to the non-volatile memory 506 to receive a list 536 of malfunctions and drifts that may be corrected by the onboard correction means in the motor vehicle.

The central control means 530 further receive as input the result of tests carried out by test means 531 adapted to determine if the unit 32 for controlling the operation of the engine is subject to a fault from the predetermined set of faults.

The central control means 530 are further connected to means 538 for sending a signal to indicate that a servicing operation is needed to the onboard correction means and to correction analysis means 540 also connected to the onboard correction means 34.

The central control means 530 are adapted to trigger the various steps of the method of the invention by commanding the means 500, 502, 516, 518 and 520 by generating a command signal E as a function of the input that it receives.

If the start means 532 determine that a vehicle engine start is the first engine start or an engine start following on from a predetermined servicing operation, the central control means 530 generate a signal for activating the means 500, 502 and 516 which then jointly determine if the cylinders and the acquisition systems are operating in the nominal operating state. The means 530 receive in return the list $L_{mal}$ of malfunctions and drifts.

If the list $L_{mal}$ of malfunctions and drifts is not empty, the central control means 530 determine if the malfunctions and drifts in the list can be corrected by the onboard correction means 34 by executing the step 222 of the method of the invention.

If the malfunctions can be corrected, the central control means 530 deactivate the means 500, 502 and 516 and activate the onboard correction means 34 and the correction analysis means 540. The correction means 34 then receive the list $L_{mal}$ of corrections to be effected and supply to the correction analysis means 540 the results of the correction. The correction analysis means 540 then evaluate the correction and supply in return their evaluation to the central control means 530.

If the correction has failed, the central control means 530 activate the means 538 for sending the signal indicating that a servicing operation is necessary.

If the correction has succeeded, the central control means 530 deactivate the correction means and the correction analysis means and then activate the means 518 and 520.

If the list $L_{mal}$ is empty, the central control means 530 determine and store the ratio reference values and the associated ranges of confidence by executing the step 113 of the method described with reference to FIG. 2 and activate the means 518 and 520 to execute the step 114 of the method.

If engine start is neither a first start nor a start following on from a servicing operation belonging to the predetermined list of servicing operations, central control means 532 disable means 500, 502 and 516 and then execute step 118 of testing triggering condition of the method according to the invention based on number of kilometers KM traveled by the motor vehicule and test results delivered by means 531.

Means 530 then enable means 518 and 520 which determine the drift state of the engine cylinders if the result of the test is positive.

Then, means 518 and 520 determine jointly the drift state of the cylinders and central control means 530 enables means 500, 502 and 516 based on results delivered by means 524 if a drift state has been diagnosed.

The person skilled in the art may envisage numerous variations on what is described above. For example, rather than triggering a correction if each malfunction or drift is identified as correctable, it is possible to trigger correction by the onboard correction means of a malfunction or drift identified as being correctable even if other malfunctions or drifts are identified as not being correctable.

What is claimed is:

1. A system for diagnosing the operating state of a motor vehicle diesel engine, the engine comprising a pressure acquisition system associated with each cylinder of the engine to acquire the pressure in that cylinder, a system for acquiring the engine shaft angle adapted to deliver the crankshaft angle of each cylinder, and onboard correction system adapted to correct a predetermined set of malfunctions of the cylinders and the acquisition systems and drifts in the operation of the cylinders, which system comprises:

analysis means for analyzing the operation of each cylinder and the cylinder pressure and engine shaft angle acquisition systems adapted to identify an operating state of the set comprising each cylinder and the cylinder pressure and engine shaft angle acquisition systems as being either a nominal operating state or one of a set of predetermined malfunctions and drifts based on predetermined characteristics of the signal delivered by the cylinder pressure acquisition system; and correction means for correcting identified malfunctions and drifts belonging to the predetermined set of malfunctions and drifts that can be corrected by the onboard correction system.

2. A system according to claim 1, the system being adapted to implement a method of diagnosing the operating state of a motor vehicle diesel engine, the engine comprising a pressure acquisition system associated with each cylinder of the engine to acquire the pressure in that cylinder, an engine shaft angle acquisition system adapted to deliver the crankshaft angle of each cylinder, and onboard correction system adapted to correct a predetermined set of malfunctions and drifts of the cylinders and the acquisition systems, which method comprises:

an analysis step of analyzing the operation of each cylinder and the cylinder pressure and engine shaft angle acquisition systems by identifying an operating state of the set comprising that cylinder and those systems as either a nominal operating state or one of a set of predetermined malfunctions and drifts based on predetermined characteristics of the signal delivered by the cylinder pressure acquisition system; and a correction step of correcting identified malfunctions and drifts belonging to the predetermined set of malfunctions and drifts that can be corrected by the onboard correction system, and further comprising a determination step of determining the operating state of each cylinder relative to a predetermined nominal operating state of the cylinder by identifying an operating state of the cylinder as either the predetermined nominal operating state of the cylinder or a predetermined drift operating state of the cylinder based on the evolution of the pressure in the cylinders and is adapted to trigger the analysis step when the determination step determines a drift operating state of a cylinder.

3. A method of diagnosing the operating state of a motor vehicle diesel engine, the engine comprising a pressure acquisition system associated with each cylinder of the engine to acquire the pressure in that cylinder, an engine shaft angle acquisition system adapted to deliver the crankshaft angle of each cylinder, and onboard correction system adapted to correct a predetermined set of malfunctions and drifts of the cylinders and the acquisition systems, which method comprises:

an analysis step of analyzing the operation of each cylinder and the cylinder pressure and engine shaft angle acquisition systems by identifying an operating state of the set comprising that cylinder and those systems as either a nominal operating state or one of a set of predetermined malfunctions and drifts based on predetermined characteristics of the signal delivered by the cylinder pressure acquisition system; and a correction step of correcting identified malfunctions and drifts belonging to the predetermined set of malfunctions and drifts that can be corrected by the onboard correction system.

4. A method according to claim 3, further comprising a determination step of determining the operating state of each cylinder relative to a predetermined nominal operating state of the cylinder by identifying an operating state of the cylinder as either the predetermined nominal operating state of the cylinder or a predetermined drift operating state of the cylinder based on the evolution of the pressure in the cylinders and is adapted to trigger the analysis step when the determination step determines a drift operating state of a cylinder.

5. A method according to claim 3, wherein the analysis step of analyzing the operation of each cylinder and the cylinder pressure and engine shaft angle acquisition systems includes the steps of:

determining a variation error between the variation of the signal delivered by the pressure acquisition system for a first predetermined range of cylinder crankshaft angles and a predetermined cylinder pressure variation model;

determining an angle error between the maximum pressure angle of the compression phase of the cylinder cycle and a predetermined model of the maximum pressure angle of the compression phase of the cylinder cycle; and identifying the operating state of the cylinder and the cylinder pressure and engine shaft angle acquisition systems as a function of the variation and angle errors so determined and of predetermined ranges of variation errors and maximum pressure angle errors of the compression phase.

6. A method according to claim 5, wherein the step of determining the variation error is a step of acquiring a population comprising a predetermined number of values of the variation of the signal delivered by the cylinder pressure acquisition system for the first predetermined range of crankshaft angles and determining the variation error as the difference between the mean value of that population and a predetermined reference value of the pressure variation in the cylinder for the predetermined range of crankshaft angles.

7. A method according to claim 5, wherein the step of determining the angle error is a step of acquiring a population comprising a predetermined number of maximum pressure angle values of the compression phase of the cylinder cycle and determining the angle error as the difference between the mean value of that population and a predetermined maximum pressure angle reference value of the compression phase of the cylinder cycle.

8. A method according to claim 5, wherein the step of identifying the operating state is a step of identifying the nominal operating state of the cylinder and the cylinder pressure and engine shaft angle acquisition systems if the variation error that has been determined is within a first predetermined range of variation errors and the angle error that has been determined is in a first predetermined range of angle errors.

9. A method according to claim 5, wherein the step of identifying the operating state is a step of identifying the nominal operating state of the cylinder and the cylinder pressure and engine shaft angle acquisition systems if the variation error that has been determined is in a first predetermined range of variation errors, the angle error that has been determined is in a first predetermined range of angle errors, the variance of the population of variation values is below a predetermined variation variance threshold, and the variance of the population of angle values if below a predetermined angle variance threshold.

10. A method according to claim 5, further comprising a determination step of determining the operating state of each cylinder relative to a predetermined nominal operating state of the cylinder by identifying an operating state of the cylinder as either the predetermined nominal operating state of the cylinder or a predetermined drift operating state of the cylinder as a function of the evolution of the pressure in the cylinders and is adapted to trigger the analysis step when the determination step determines a drift operating state of a cylinder, and wherein the step of determining the operating state of each cylinder relative to the predetermined nominal operating state comprises the step of:

determining a ratio error between a predetermined ratio model and the ratio of a cylinder pressure variation to the sum of pressure variations in the other cylinders, each of the cylinder pressure variations corresponding to the pressure variation for a second predetermined range of crankshaft angles; and identifying a drift operating state of the cylinder as being either the nominal operating state or the drift operating state of the cylinder as a function of a predetermined range of ratio errors.

11. A method according to claim 10, wherein the step of determining a ratio error comprises the step of:

acquiring a population comprising a predetermined number of n-plets of pressure variation values for each engine cylinder and for the second range of crankshaft angles, where n is the number of cylinders of the engine;

generating for each n-plet the ratio of the cylinder pressure variation to the sum of the pressure variations in the other cylinders in order to obtain a population of ratios for the cylinder; and determining the ratio error as the difference between the mean value of the population of ratios for the cylinder and a predetermined reference ratio value for the cylinder.

12. A method according to claim 10, wherein the step of identifying the drift operating state of the cylinder id a step of determining the nominal operating state of the cylinder if the ratio error is in the first predetermined range of ratios.

13. A method according to claim 10, wherein the reference cylinder pressure ratio value and the first range of ratio errors are respectively the mean value and a range of confidence of predetermined risk of a Gaussian distribution of the mean value of the cylinder pressure ratio determined after the first engine start.

14. A method according to claim 5, further comprising a determination step of determining the operating state of each cylinder relative to a predetermined nominal operating state of the cylinder by identifying an operating state of the cylinder as either the predetermined nominal operating state of the cylinder or a predetermined drift operating state of the cylinder as a function of the evolution of the pressure in the cylinders and is adapted to trigger the analysis step when the determination step determines a drift operating state of a cylinder, and wherein the step of determining the drift operating state of each cylinder is triggered if the nominal operating state has been identified for each cylinder and the cylinder pressure and engine shaft angle acquisition systems.

15. A method according to claim 5, further comprising a determination step of determining the operating state of each cylinder relative to a predetermined nominal operating state of the cylinder by identifying an operating state of the cylinder as either the predetermined nominal operating state of the cylinder or a predetermined drift operating state of the cylinder as a function of the evolution of the pressure in the cylinders and is adapted to trigger the analysis step when the determination step determines a drift operating state of a cylinder, and wherein the step of determining the operating state of each cylinder is triggered regularly.

16. A method according to claim 3, wherein the step of identifying the operating state of the cylinder and the cylinder pressure and engine shaft angle acquisition systems is a step of identifying a malfunction or a drift in the cylinder and/or the cylinder pressure acquisition system and/or the engine angle acquisition system if the nominal operating state is not identified and determining if the malfunction or drift that has been identified belongs to the predetermined set of malfunctions and drifts correctable by the onboard correction system in the motor vehicle.

17. A method according to claim 3, a signal is emitted to indicate that a servicing operation is necessary if at least one malfunction is identified as not being correctable by the onboard correction system and the correction step is triggered if at least one malfunction is identified as being correctable by the onboard correction system.

18. A method according to claim 3, wherein the step of analyzing the operation of each cylinder and the cylinder pressure and engine shaft angle acquisition systems is triggered after a first engine start or after an engine start following predetermined servicing operations and with the engine idling.

19. A method according to claim 3, including a step of evaluating the results of the correction applied by the onboard correction system and emitting a signal to indicate that a servicing operation is necessary if the evaluation of the results of the correction determines that the correction has failed.

* * * * *